United States Patent Office 3,084,035
Patented Apr. 2, 1963

3,084,035
ADDITIVES TO IMPROVE THE ELECTRICAL PROPERTIES OF COMBUSTIBLE ORGANIC LIQUIDS
Dilworth T. Rogers, Summit, and John P. McDermott, Springfield, N.J., assignors to Esso Research and Engineering Company, a corporation of Delaware
No Drawing. Filed Feb. 19, 1960, Ser. No. 9,690
16 Claims. (Cl. 44—66)

The present invention relates to the use of additives to improve the properties of combustible organic fluids and more particularly relates to aviation turbo-jet fuels, gasolines, kerosines, organic solvents and similar combustible liquids boiling in the range between about 75° F. and about 750° F. which have been improved with respect to their electrical properties by the incorporation therein of small amounts of certain complex additive agents prepared by the reaction of chromium salts of low molecular weight carboxylic acids with high molecular weight carboxylic acids.

Numerous explosions have occurred in recent years during the transportation and handling of gasolines, turbo-jet fuels, dry cleaning solvents and similar combustible organic liquids boiling in the range between about 75° F. and about 750° F. There is mounting evidence that these explosions have, in many cases, been caused by the generation and accumulation of electrical charges within the liquid until vapors of the liquids in admixture with air are ignited by an electrical discharge. Aviation turbo-jet fuels and certain solvents, carbon disulfide for example, are particularly hazardous in this respect because their vapors form explosive mixtures with air and hence any electrical discharge which occurs is likely to cause an explosion.

Although the exact mechanisms involved in the generation, accumulation and discharge of electrical energy during the handling of combustible liquids are not fully understood, it is known that the electrical conductivity of the liquid plays an important role. Increasing the conductivity of the liquid increases the rate at which charges are naturally dissipated and therefore charges sufficient to cause an explosion are less likely to accumulate. In general, it has been found that liquids having specific conductivities in the range of about $1 \times 10^{-15}$ and about $1 \times 10^{-12}$ mhos per centimeter are particularly hazardous and that the danger in handling such liquids can be materially reduced by increasing their conductivities to values greater than about $1 \times 10^{-12}$ mhos per centimeter.

It has been suggested heretofore that certain compounds be added to liquid hydrocarbons and similar combustible materials in order to increase specific conductivity and thus reduce the danger of an explosion due to the generation, accumulation and discharge of electrical energy. Certain metallic compounds, particularly soaps of polyvalent metals and combinations of such soaps with other materials, have been said to be particularly effective. In practice, however, such additives have been found to be of little value because they are readily extracted by water with which the liquids come into contact and because they adversely affect such properties of the liquids as water tolerance and thermal stability.

The present invention provides a new and improved class of additive agents for use in combustible organic liquids boiling in the range between about 75° F. and about 750° F. which greatly improve the electrical properties of such liquids and do not share the undesirable properties which have characterized additives proposed for this purpose in the past. In accordance with the invention, it has now been found that certain chromium complex substances have the property of greatly increasing the conductivity of hydrocarbon oils and similar organic liquids, are not extracted by water from such liquids to an extent sufficient to prevent their utilization, and do not adversely affect other properties of the liquids to which they are added. This combination of properties renders such chromium complexes eminently suitable for reducing the hazards normally encountered in handling, storage, and transporting such liquids. Although the use of other multivalent metal complexes such as aluminum may be suitably employed for certain applications, chromium complexes are preferred due to their unhydrolyzable nature, lower molecular weight, and the like. The trivalent chromium complexes are especially preferred and are most suitable for the purposes of this invention.

The chromium complex additive agents which are employed in accordance with the invention are complexes prepared by the treatment of chromium salts of low molecular weight carboxylic acids containing from about 1 to about 6 carbon atoms per molecule with carboxylic acids in polar mediums.

The low molecular weight carboxylic acids suitable for use in preparing the complexes of the invention include saturated and unsaturated, substituted and unsubstituted aliphatic monocarboxylic acids having from 1 to 6 carbon atoms per molecule. Examples of such acids include formic acid, acetic acid, propionic acid, furoic acid, acrylic acid, lactic acid and the like. Saturated low molecular weight acids containing from 2 to about 4 carbon atoms per molecule are preferred. Acetic acid has been found to be particularly effective. Mixtures of the low molecular weight monocarboxylic acids may be employed if desired.

The high molecular weight carboxylic acids suitable for use in preparing the additive complex substances of the invention include those organic aromatic and aliphatic carboxylic acids having an average molecular weight of from 80 to 700, with those monocarboxylic acids having an average molecular weight of from 120 to 350 being preferred.

Suitable carboxylic acids that are preferred include:
(a) Aliphatic saturated and unsaturated substituted and unsubstituted monocarboxylic acids having from 8 to 30 carbon atoms per molecule. Saturated and unsaturated fatty acids having from 12 to 24 carbon atoms per molecule are esepecially preferred. Suitable saturated fatty acids include: tridecoic acid, myristic acid, palmitic acid, stearic acid, lauric acid, and the like. Suitable unsaturated fatty acids include: ricinoleic acid, linoleic acid, linolenic acid, oleic acid, erucic acid, and the like.

(b) Sulfurized monocarboxylic acids having from 8 to 30 carbon atoms per molecule. These sulfurized acids may be prepared by the reaction of elemental sulfur with an unsaturated fatty acid having the prerequisite number of carbon atoms and by other methods known to those skilled in the art. One method of preparation is the direct reaction of about equimolar quantities of an unsaturated fatty acid with elemental sulfur at temperatures of from about 300° F. to about 360° F. The reaction is usually conducted under a blanket of an inert gas such as nitrogen with stirring for a period of from 0.5 to 2 hours. Sulfurized fatty acids having from 12 to 24 carbon atoms per molecule are especially preferred. Suitable sulfurized fatty acids include: sulfurized oleic acid, sulfurized ricinoleic acid, sulfurized linoleic acid, and the like.

(c) Polymerized fatty acids prepared by the dimerization, trimerization, or polymerization of the unsaturated fatty acids described before having from 8 to 30 carbon atoms per molecule in their unpolymerized state. Polymerized fatty acids derived from unsaturated fatty acids having from 12 to 24 carbon atoms are especially preferred. A suitable commercial example of such polymerized acids is Dimer Acid, a product of Emery Industries Inc., comprising polymerized linoleic acid having about 85% of the dimer, 12% of the trimer and about 3% of the monomer, with an iodine value of approximately 80 to 95 and a neutralization number of about 295 to 310. These polymerized acids have two to three carboxyl groups per molecule.

(d) Aromatic substituted and unsubstituted monocarboxylic acids. Alkylated aromatic acids having alkyl groups of from 8 to 30 carbon atoms in length are preferred, with those alkyl groups having from 12 to 18 carbon atoms per group especially preferred. Suitable aromatic acids include: benzoic acid, toluic acid, naphthoic acid, and the like. Suitable hydroxy aromatic acids include: salicylic acid, methyl salicylic acid, gallic acid, protocatchuic acid, hydroxy benzoic acid, 2-hydroxy-3-naphthoic acid, β-resorcylic acid, and the like. Suitable hydroxy alkylated aromatic acids include: dodecylsalicylic acid, and the like.

The carboxylic acids utilized in the preparation of the complexes of this invention may be those commercial acids or mixtures thereof derived from animal, vegetable and natural fats and oils or any combination thereof whose average molecular weight is within the above definitition of suitable carboxylic acids or whose major constituents fall within the scope of the suitable acids as described above. Suitable examples of such commercial acids would be those acids derived from cotton seed, coconut oil, soya beans, linseed oil, peanut oil, olive oil, corn, sperm oil, tung oil, and the like.

The most preferred carboxylic acid of the invention is oleic acid due to the ease of preparation and economic advantage in preparing the complex substance of this invention.

The complex substances employed in accordance with this invention can be formed by dissolving the chromium salt of the low molecular weight acid and the high molecular weight carboxylic acid in an alcohol or alcohol-hydrocarbon mixture, followed by heating to about 180° F. to about 300° F. to remove the reaction solvent. The presence of a polar medium for the reaction is critical in order to obtain complex substances of suitable effectiveness. Suitable polar substances are low molecular weight aliphatic and aromatic alcohols having from 1 to about 10 carbon atoms with low molecular weigh primary saturated aliphatic alcohols of from 1 to 6 carbon atoms per molecule especially preferred. Examples of suitable alcohols include ethanol, methanol, isopropanol, butanol, amyl alcohol, actyl alcohol, benzyl alcohol, and the like. The polar medium can also be effectively employed in combination with hydrocarbons such as benzene, xylene, toluene, kerosene, hydrocarbon oils, hexane, isooctane, and the like. These polar and polar-nonpolar reaction solvents are hypothesized to function as mutual solubilizing agents for the chromium salt and the carboxylic acid, and to aid in the preparation of the proper complex substances.

The reactants should be employed in quantities to give a mol ratio of from about 1 to about 25 parts of the carboxylic acid to each part of the chromium salt. Carboxylic acid to chromium salt ratio in the range between about 2 to 1 and about 12 to 1 mols per mol are preferred. The complexes thus formed will preferably contain from about 0.2 to about 6.0% chromium by weight. The amount of chromium present will, of course, depend upon the mol ratio in which the reactants are employed.

In a preferred embodiment of the invention, the complex substances prepared in the manner described above are subjected to dialysis or similar treatment in order to remove certain constituents. It has been found that the materials in the complexes that are retained by a semipermeable membrane are more active for increasing conductivity than are the other constituents. Experience has shown that this undialyzable fraction of the complex, normally from about 1 to about 60% of the total complex, may be as much as 100 times more effective than the dialyzable fraction and as much as 4 times more effective than the total complex. Dialysis techniques suitable for separating the constituents of the complexes are well known and will be familiar to those skilled in the art.

The chromium complex substances prepared in the manner described above may be added to combustible organic liquids boiling in the range between about 75° F. and about 750° F. in accordance with the invention in minor amounts or in concentrations ranging between about 0.00001% and about 0.1% by weight. Concentrations between about 0.0001% and about 0.05% by weight are generally preferred. As has been pointed out heretofore, it has been found that the effectiveness of the additive material depends somewhat on the quantity of materials in the complex that is retained by a semipermeable membrane and the exact concentrations employed may therefore depend somewhat upon whether the complex substance as formed or a complex subjected to dialysis or similar treatment to remove certain constituents is employed.

The combustible organic liquids in which the additives of the invention may be employed advantageously are those boiling in the range between about 75° F. and about 750° F. and include carbon disulfide, hexane, heptane, diethyl ether, toluene, petroleum naphtha, xylene, gasoline, aviation turbo-jet fuel, kerosene and the like. The additives are particularly useful in gasoline, aviation turbo-jet fuel, kerosine, diesel fuel and similar petroleum distillate fuels. Gasolines which may be benefited by the presence of the additives include both motor gasolines and aviation gasolines such as those defined by ASTM specifications D–910–56 and D–439–56T. Aviation turbo-jet fuels in which the additives of the invention are particularly useful are described at length in U.S. military specification MIL–F–5616, MIL–F–5624–D, MIL–F–25558A and MIL–F–25524A. Diesel fuels as referred to in connection with the invention are defined in ASTM specification D–975–53T.

If desired, the additive agents of the invention may be incorporated into petroleum distillate fuels in the form of an additive concentrate containing the chromium complex materials in combination with other additives conventionally used in such fuels. Such conventional additives include rust inhibitors, dyes, dye stabilizers, anti-oxidants, and the like. A volatile, inert organic solvent such as benzene, xylene, toluene, diethylene glycol, pyridine or the like may be used as the vehicle in such a concentrate.

The exact nature and objects of the invention may be more fully understood by reference to the following examples:

EXAMPLE 1

Complexes were prepared by reacting chromic acetate and oleic acid as follows:

(A) A solution of 2.47 grams of chromic acetate (0.01 mol) in 50 ml. of ethanol was added to a solution of 16.9 grams of oleic acid (0.06 mol) in 50 ml. of ethanol. The resulting solution was evaporated to dryness on the steam bath, whereupon 17.9 grams of a reddish-green, tacky solid were obtained containing 2.9% by weight of chromium.

(B) A mixture of 137.5 grams of oleic acid (0.5 mol) and 16.0 grams of sulfur (0.5 mol) was heated for one hour at 165–175° C. with stirring under a nitrogen gas blanket. A clear, dark red liquid was obtained.

A solution of 1.235 of chromic acetate (0.005 mol) in 25 ml. of ethanol was added to a solution of 9.4 grams of the sulfurized oleic acid (0.03 mol) in 100 ml. of ethanol. The resulting solution was evaporated to dryness on the steam bath whereupon 10.2 grams of a reddish-green viscous liquid were obtained containing 2.6% by weight of chromium.

EXAMPLE 2

Chromic acetate-carboxylic acid complexes prepared by the methods described in the preceding example were added to samples of an aviation turbo-jet fuel and tests were carried out to determine the effectiveness of the additives for increasing the specific conductivity of the fuel. The fuel employed in carrying out these tests was representative of the aviation turbo-jet fuel classified as JP-4 fuel and defined by U.S. military specification MIL-F-5624D. It had an API gravity of 48.7°, a Reid vapor pressure of about 2.5 pounds per square inch and a boiling range between about 100° and about 500° F.

The tests were carried out by applying a fixed, direct-current voltage across a standard conductivity cell containing the sample to be tested. A standard high-resistance element was connected in series with the cell and the current which flowed in the circuit during the test was computed by measuring the voltage across the resistance element and applying Ohm's law. The resistance of the sample, the specific resistance and the specific conductivity were in turn computed. The results of these tests are shown below for the base fuel and for the samples of the base fuel containing the various salts.

*Table I*

EFFECT OF 0.002 WT. PERCENT OF ADDITIVE UPON CONDUCTIVITY OF BASE JP-4 [1]

| Chromic Acetate Complexed With— | Mol Ratio of Acid/Chromic Acetate | Wt. Percent Cr in Complex | Conductivity, $\sigma$ mho/cm. $\times 10^{-12}$ | Ratio, $\sigma$ Base + Additive to $\sigma$ Base |
|---|---|---|---|---|
| Oleic Acid | 1/2 | 13.4 | 1.9 | 63 |
| Do | 1/1 | 10.9 | 13.0 | 433 |
| Do | 2/1 | 7.3 | 8.4 | 280 |
| Do | 3/1 | 5.6 | 6.5 | 217 |
| Do | 6/1 | 2.9 | 21.2 | 707 |
| Do | 12/1 | 1.5 | 2.8 | 93 |
| Do | 18/1 | 1.0 | 8.7 | 290 |
| Do | 24/1 | 0.76 | 6.1 | 203 |
| Do | 48/1 | 0.38 | 1.9 | 63 |
| Sulfurized Oleic Acid | 2/1 | 5.4 | 13.5 | 450 |
| Do | 3/1 | 4.3 | 21.3 | 710 |
| Do | 6/1 | 2.6 | 19.0 | 633 |
| Do | 12/1 | 1.1 | 14.5 | 483 |
| Do | 18/1 | 0.9 | 5.6 | 187 |
| Do | 24/1 | 0.7 | 2.3 | 77 |
| Do | 48/1 | 0.34 | 1.0 | 33 |
| Ricinoleic Acid | 1/1 | 11.0 | 2.1 | 70 |
| Do | 3/1 | 5.0 | 7.2 | 240 |
| Do | 6/1 | 2.8 | 8.1 | 270 |
| Do | 12/1 | 1.4 | 10.0 | 333 |
| Do | 24/1 | 0.72 | 5.2 | 173 |
| Dimer Acid [2] | 12/1 | 0.89 | 0.84 | 28 |
| Salicyclic Acid | 3/1 | 9.4 | 16.0 | 530 |
| Dodecylsalicylic Acid | 3/1 | 4.9 | 61.2 | 2,040 |

[1] Base JP-4 fuel gave a conductivity of $0.03 \times 10^{-12}$ mho/cm.
[2] As previously described in the specification.

The data in the above table demonstrates the significant increase in specific conductivity of combustible organic liquids which occurs as a result of the addition thereto of the chromium complex substances of the invention. The data demonstrate that complexes prepared with a carboxylic acid in a ratio between about 1 and about 25 mols of the carboxylic acid per mol of the chromium salt are much more effective than those prepared by employing reactants outside that range. It will be noted that when the mol ratios were in the preferred range of 2 to 12 to 1, that exceptional results occurred. Furthermore, while oleic acid gave excellent results and is economically preferable, the sulfurized oleic acid gave better results over a broader range of mol ratios. Salicyclic acid was an effective aromatic acid, but dodecylsalicylic acid appeared to be much more effective, thus the long chain alkyl derivatives of aromatic acids are to be preferred. The data in the table thus demonstrates that the additive complexes of the invention greatly increase the electrical conductivity of organic combustible liquids.

EXAMPLE 3

To demonstrate the effect of the concentration of the additive complexes of the invention upon the specific conductivity of combustible organic liquids, further tests were carried out wherein a chromic acetate-oleic acid complex containing oleic acid and chromic acetate in a mol ratio of 6/1 were added to samples of a JP-4 aviation turbo-jet fuel similar to that employed in the preceding example in concentrations ranging from 0.005 wt. percent to 0.00005 wt. percent. The specific conductivity of the base fuel and that of the samples containing the additives in various concentrations were then measured. The results obtained are shown in Table II.

*Table II*

EFFECT OF ADDITIVE CONCENTRATION ON CONDUCTIVITY OF JP-4

| Concentration of Oleic Acid-Chromic Acetate Complex (6/1) In JP-4 Fuel | Specific Conductivity, $\sigma$ mho/cm. $\times 10^{-12}$ | Ratio, $\sigma$ Base + Additive to $\sigma$ Base |
|---|---|---|
| No Additive | 0.03 | |
| 0.00005 | 1.06 | 35 |
| 0.0001 | 2.32 | 77 |
| 0.0005 | 10.30 | 343 |
| 0.001 | 23.20 | 773 |
| 0.002 | 45.30 | 1,510 |
| 0.005 | 103.0 | 3,433 |

As shown in Table II, as little as 0.00005 wt. percent of the chromic acetate-oleic acid complex markedly increased the specific conductivity of the base fuel from a level of $0.03 \times 10^{-12}$ mhos per centimeter to $1.06 \times 10^{-12}$ mhos per centimeter. The specific conductivity of the base fuel employed in this test was considerably lower than that of many turbo-jet fuels and other combustible organic liquids in which the additive complexes of the invention will be employed. In such liquids having higher initial specific conductivities, the additive complexes may be employed in concentrations below the 0.002 wt. percent concentration employed in the tests reported in Table I of Example 1.

EXAMPLE 4

Water is frequently encountered in bulk handling of aviation turbo-jet fuels, kerosenes and similar combustible liquids. The effect of additives employed in such liquids upon their water tolerance properties is, therefore, of primary importance. It has been found that many of the additives suggested as useful for increasing the conductivity of combustible organic liquids in the past are highly surface-active materials which have an extremely adverse effect upon water tolerance. The increased conductivity brought about through the use of such additives may largely be offset as a result of this tendency to promote the suspension of dispersed water.

Water tolerance tests were carried out in accordance with the method described in Federal Test Standard No. 791, Method 3251.6, "Interaction of Water in Aircraft Fuel," in order to determine the effect of the additive complexes of the invention upon the water tolerance of combustible organic liquids to which they are added. The test employed involves the agitation of 80 cc. of the fuel to be tested with 20 cc. of water for a 2 minute period, followed by a 5 minute settling period. At the end of this settling period, the condition of the water-fuel interface is noted. A rating is assigned to the fuel in accordance with the following criteria:

INTERACTION OF WATER AND AIRCRAFT FUELS
[Method 3251.6, Fed. Test Std. No. 791]

| Appearance of interface: | Interface rating |
|---|---|
| Clear and clean | 1 |
| A few small clear bubbles covering not more than 50% of the interface | 1B |
| Shred of lace and/or film at interface | 2 |
| Loose lace and/or slight scum | 3 |
| Tight lace and/or heavy scum | 4 |

The results of these tests and tests of other materials proposed heretofore for increasing the specific conductivity of jet fuels are shown below.

*Table III*

WATER TOLERANCE OF COMPLEX ADDITIVES

| Composition: | Interface rating |
|---|---|
| Base JP-4 | 1 |
| Base JP-4+0.002 wt. percent chromic acetate-oleic acid (1/6) complex | 1 |
| Base JP-4+0.002 wt. percent chromic acetate-sulfurized oleic acid (1/3) complex | 1 |
| Base JP-4+0.01 wt. percent of calcium petroleum sulfonate | 4 |
| Base JP-4+0.05 wt. percent of sodium dioctyl sulfo-succinate | 4 |
| Base JP-4+0.01 wt. percent of lecithin | 4 |

The addition of 0.002 wt. percent of a chromic acetate-oleic acid and sulfurized oleic acid complex to the base fuel employed in the test reported in Table III had no affect upon the interface rating, whereas the prior art materials rendered the fuel unacceptable from the standpoint of water tolerance. It is therefore evident that this additive meets the critical water tolerance requirements for turbo-jet aviation fuels and represents an improvement over materials of the prior art.

EXAMPLE 5

As has been pointed out heretofore, it has been found that the activity of the additive complexes of the invention is primarily due to certain constituents therein. This is demonstrated by a series of experiments in which complexes prepared in the manner described in Example 1 were dialyzed in order to separate the components of the complexes. The dialysis separations were carried out using a semi-permeable rubber membrane-isooctane system. An oleic acid-chromic acetate complex was prepared using a ratio of oleic acid to chromic acetate of 6/1. This complex was tested to determine its effect on the specific conductivity of aviation turbo-jet fuel. The fractions of this same complex obtained as a result of the dialysis were similarly tested. The results of the tests are shown in Table IV.

*Table IV*

DIALYSIS OF OLEIC ACID/CHROMIC ACETATE COMPLEX (6/1)

| JP-4+0.002 Wt. Percent of Complex | Wt. Percent Cr in Complex | Conductivity, σ mho/cm.× 10⁻¹² | Ratio, σ Base+ Additive to σ Base |
|---|---|---|---|
| Original Additive | 2.9 | 45.3 | 1,510 |
| Fraction (I) | 0 | 0.29 | 9.7 |
| Fraction (II) | 5.87 | 287.0 | 9,560 |
| No Additive | | 0.03 | |

(I) Isooctane soluble fraction, 45.3% of total, passed through membrane.
(II) Isooctane insoluble fraction, 53.0% of total, retained by membrane.

From Table IV, it can be seen that the fractions of the chromic acetate-carboxylic acid complex substances retained by the semi-permeable membrane are surprisingly more effective in promoting electrical conductivity than the fraction that passed through the membrane or the total complex substances alone. The chromic acetate-oleic acid complex fraction retained by the membrane was about 1000 times more effective for increasing the specific conductivity than the fraction that passed through the membrane, and about 6 to 7 times more effective than the total complex alone. The reasons for the significant superiority of one fraction is not fully understood; however, the advantages of employing this fraction to increase the electrical conductivity of combustible organic liquids are obvious. Because of the expense in separating the complex substances of such additives, it will, in most cases, be preferred to employ the total complexes rather than merely certain constituents of the complexes. The materials retained by a semi-permeable membrane will, however, be particularly effective for use in applications where extremely small additive concentrations must be employed, as in the case of certain fuels designed for use in engines in which it is desired to maintain the ash content at an absolute minimum.

EXAMPLE 6

To demonstrate the effectiveness of the inventive complex substances in promoting electrical conductivity in organic combustible liquids, an oleic acid-chromic acetate complex was prepared using a 3/1 ratio and tested in carbon disulfide.

*Table V*

EFFECT OF 0.002 WT. PERCENT OLEIC ACID/CHROMIUM ACETATE COMPLEX (3/1) IN CARBON DISULFIDE

| | Conductivity, σ mho/cm. | Ratio, σ Base + Additive to σ Base |
|---|---|---|
| No Additive | 5.0 × 10⁻¹⁴ | |
| Oleic Acid/Chromic Acetate Additive 0.002%. | 2.58 × 10⁻¹⁰ | 5,160 |

The amazing effectiveness of the complex substances of the invention in promoting the electrical conductivity in combustible organic liquids other than hydrocarbons can be readily ascertained by the above results. From the data it has been demonstrated that the use of an oleic acid/chromic acetate complex increased the electrical conductivity of the carbon disulfide over 5000 times. The effectiveness of these complexes in promoting electrical conductivity in a wide variety of liquid mediums is thus shown.

It will be understood that modifications within the skill of those persons adept in the art may be made without departing from the scope of the invention. The additives of the invention may, for example, be advantageously employed in conjunction with other additives designed to improve the electrical properties of combustible organic liquids.

What is claimed is:

1. A combustible organic liquid boiling in the range between about 75° F. and about 750° F., to which has been added a minor amount sufficient to improve the electrical properties of said liquid of a complex of a chromium salt of an aliphatic monocarboxylic acid containing from 1–6 carbon atoms per molecule and a high molecular weight organic carboxylic acid having an average molecular weight of from 80 to about 700, the mol ratio of said acid and said chromium salts in said complex ranging from about 1/1 to about 25/1, said complex being obtained by reacting the chromium salt with the carboxylic acid in the presence of a low molecular weight alcohol having from 1 to 10 carbon atoms per molecule.

2. A combustible organic liquid composition as defined by claim 1, wherein said chromium salt is chromium acetate.

3. A combustible organic liquid composition as defined by claim 1, wherein said carboxylic acid and said chromium salt are complexed in a mol ratio between about 2/1 and about 12/1.

4. A combustible organic liquid composition as defined by claim 1, wherein said complex contains from about 0.2 to about 6.0% chromium by weight.

5. A combustible organic liquid composition as defined by claim 1, wherein said carboxylic acid is a fatty acid having from 8 to about 30 carbon atoms per molecule.

6. A combustible organic liquid composition as defined by claim 1, wherein said carboxylic acid is a sulfurized fatty acid having from 8 to about 30 carbon atoms per molecule.

7. A combustible organic liquid composition as defined by claim 1, wherein said carboxylic acid is an alkylated aromatic acid, wherein the alkyl groups have from 8 to 30 carbon atoms in each group.

8. A combustible organic liquid composition as defined by claim 1, wherein said carboxylic acid is a polymerized unsaturated fatty acid having from 8 to about 30 carbon atoms per unpolymerized molecule.

9. A combustible organic liquid composition as defined by claim 1 wherein said carboxylic acid is an aromatic acid.

10. A combustible organic liquid composition as defined by claim 8, wherein said monocarboxylic acid is polymerized linoleic acid.

11. A combustible organic liquid composition as defined by claim 8, wherein said monocarboxylic acid is oleic acid.

12. A combustible organic liquid composition as defined by claim 8, wherein said monocarboxylic acid is dodecylsalicylic acid.

13. A combustible organic liquid composition as defined by claim 8, wherein said monocarboxylic acid is sulfurized oleic acid.

14. A combustible organic liquid composition as defined by claim 8, wherein said organic liquid is a petroleum distillate fuel boiling in the range between 75° F. and about 750° F.

15. A combustible organic liquid boiling in the range between about 75° F. and about 750° F. to which has been added from about 0.00001% to about 0.1% by weight of a complex of a chromium salt of a saturated low molecular weight aliphatic monocarboxylic acid having from 2 to about 4 carbon atoms per molecule and a high molecular weight monocarboxylic acid having an average molecular weight of from 120 to about 350, the mol ratio of said acid and said chromium salt in said complex ranging from about 1 to 1 to about 25 to 1, said complex being obtained by reacting the chromium salt and the monocarboxylic acid in the presence of a saturated unsubstituted low molecular weight aliphatic alcohol having from 1 to 6 carbon atoms per molecule and wherein said complex contains from about 0.2 to about 6% chromium by weight.

16. A combustible organic liquid boiling in the range between about 75° F. and about 750° F. to which has been added from about 0.05 to 0.0001% by weight of a complex of chromium acetate and a high molecular weight aliphatic monocarboxylic acid having an average molecular weight of from 120 to about 350, the mol ratio of said acid and said chromium salt in said complex ranging from about 2 to 1 to about 12 to 1, said complex being obtained by reacting the chromium acetate and the monocarboxylic acid in the presence of a saturated unsubstituted low molecular weight aliphatic alcohol having from 1 to 6 carbon atoms per molecule, and wherein said complex contains from about 0.2 to about 6.0% chromium by weight.

References Cited in the file of this patent

UNITED STATES PATENTS

| | | |
|---|---|---|
| 2,832,677 | Morway | Apr. 29, 1958 |
| 2,846,392 | Morway | Aug. 5, 1958 |

FOREIGN PATENTS

| | | |
|---|---|---|
| 749,898 | Great Britain | June 6, 1956 |